(12) United States Patent
Lu et al.

(10) Patent No.: US 6,170,027 B1
(45) Date of Patent: Jan. 2, 2001

(54) LPC/ISA BRIDGE AND ITS BRIDGING METHOD

(75) Inventors: Max Lu; Cheng-Chih Wang, both of Hsinchu Hsien (TW)

(73) Assignee: Winbond Electronics Corp., Hsinchu (TW)

( * ) Notice: Under 35 U.S.C. 154(b), the term of this patent shall be extended for 0 days.

(21) Appl. No.: 09/186,956

(22) Filed: Nov. 5, 1998

(30) Foreign Application Priority Data

Aug. 15, 1998 (TW) .................................................. 87113469

(51) Int. Cl.[7] ....................................................... G06F 13/00
(52) U.S. Cl. .............................. 710/65; 710/101; 710/129
(58) Field of Search ................................... 710/1, 62, 63, 710/65, 72, 100, 101, 129

(56) References Cited

U.S. PATENT DOCUMENTS 5,991,841 * 11/1999 Gafken et al. ....................... 710/104

* cited by examiner

Primary Examiner—Xuan M. Thai
(74) Attorney, Agent, or Firm—Ladas & Parry

(57) ABSTRACT

A LPC/ISA bridge and its bridging method are disclosed for bridging an LPC interface to an ISA interface. The LPC/ISA bridge is activated in response to a duty cycle indicative signal (LFRAME#), and serially transforms related command, address and data information from command/address/data lines (LAD[3:0]) of the LPC interface into address, data and control signals of the ISA interface. Therefore, the problem as to the interface incompatibility is solved.

7 Claims, 4 Drawing Sheets

LPC/ISA BRIDGE AND ITS BRIDGING METHOD

BACKGROUND OF THE INVENTION

1. Field of the Invention

The present invention relates to a bridge and its bridging method, and in particular, to an LPC/ISA bridge for bridging an LPC interface to an ISA interface.

2. Description of the Related Art

Presently, many IBM-compatible computers still choose ISA interfaces for their expansion cards, for example a super-I/O card having therein a floppy controller, a keyboard controller, a parallel/serial port, etc. However, with the development of computer system techniques, the ISA interface is no longer sufficient to make the best of new computer systems, regardless of the operating speed or controllability.

Therefore, several companies have tried to provide new interfaces to replace the ISA interface. As an example, Intel Corp. has disclosed a low pin count (LPC) interface to replace the ISA interface. The LPC interface is superior in several features. For instance, the LPC interface transmits address and data signals serially, so the number of pins needed can be greatly reduced. In general, the number of pins needed in the LPC interface is less than that in the ISA interface by about 30. As a result, the layout complexity and the limitation on the integration multiple functions on the same IC (that is, the number of pins) are both lessened. Furthermore, the LPC interface operates at a clock frequency of 33 MHz, as a result, the transmission speed is not lowered even though the address and data signals are serially transmitted. Consequently, the LPC interface stands a good chance to replace the ISA interface, taking both market (because the chipset provided by Intel Corp. will support the LPC interface) and technology into account.

However, as the ISA interface is a highly standardized interface used for a long time, there are still many peripheral ICs in the market compatible with the ISA interface. Therefore, the problem of interface conversion will occur. The peripheral ICs using the ISA interface will no longer be used in newly designed mother boards and chipsets using the LPC interface, so interface incompatibility will occur.

SUMMARY OF THE INVENTION

Accordingly, it is an object of the present invention to provide an LPC/ISA bridge for bridging an LPC interface to an ISA interface and its bridging method, which can transform related information needed between the LPC interface and the ISA interface, integrate devices (such as expansion slots and peripheral chips) using different interfaces in the same computer system, and solve problems as to the interface incompatibility.

To realize the above and other objects, the present invention provides an LPC/ISA bridge installed on an expansion card, for bridging an LPC interface to an ISA interface. The LPC/ISA bridge is active in response to a duty cycle indicative signal (LFRAME#) of the LPC interface and sequentially interprets related command, address and data information from command/address/data lines (LAD[3:0]) of the LPC interface, so as to produce the address, data and control signals of the ISA interface. Thereby, the control/address/data information can be converted into various formats between the LPC interface and the ISA interface, achieving the object of the present invention.

The LPC/ISA bridge includes a counter-based state machine and a decoder. The counter-based state machine receives a duty cycle indicative signal (LFRAME#) of the LPC interface. When a duty cycle is activated by the duty cycle indicative signal, the counter-based state machine counts in response to a clock signal and serially outputs several state signals. The counter-based state machine stops counting and outputting after a certain number of cycles inherently depending of decoding of cycle type. The decoder receives the state signals of the counter-based state machine, command/address/data lines (LAD[3:0]) of the LPC interface and other signal lines. In response to the state signals, the decoder can abstract command, address and data information from the command/address/data lines of the LPC interface and transform them into address, data and control signals of the ISA interface. Thereby, information abstracted from the command/address/data lines of the LPC interface can be transformed into related signals of the ISA interface, achieving the object of the present invention.

Further, in the bridging method of the present invention, after the counter-based state machine produces a series of state signals, the decoder can latch the address information from the command/address/data lines in response to a first set of the state signals which are corresponding to an address field of the command/address/data lines, then output the obtained address information in parallel to produce the address signal of the ISA interface. The decoder can also latch the data information from the command/address/data lines in response to a second set of the state signals, then output the obtained data information in parallel to produce the data signal of the ISA interface. Thereby, signals used in different interfaces can be converted to solve the interface incompatibility.

BREIF DESCRIPTION OF THE DRAWINGS

Further objects, features and advantages of the present invention will become apparent from the following detailed description of a preferred embodiment of the invention with reference to the accompanying drawings.

DETAILED DESCRIPTION OF THE PREFERRED EMBODIMENT

Figure 1:
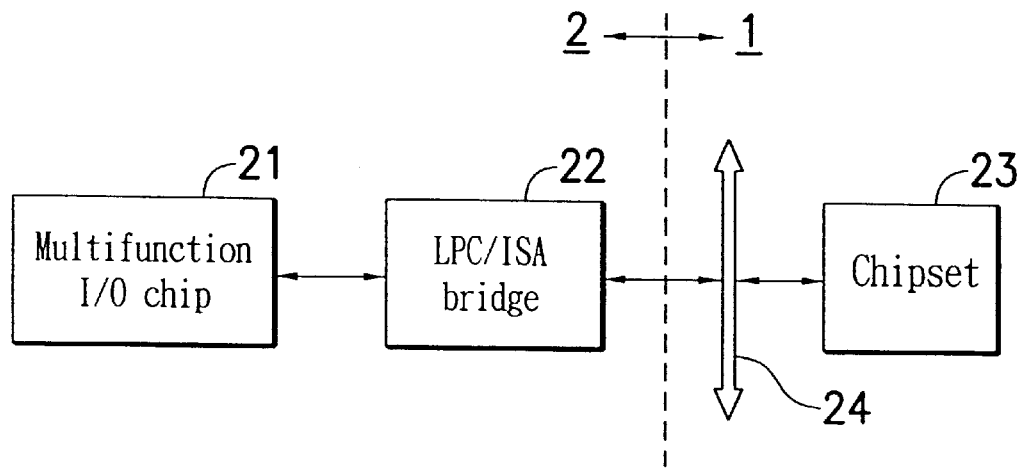
FIG. 1 is a system structure diagram showing an LPC/ISA bridge according to an embodiment of the present invention.

The LPC/ISA bridge of the present invention is for bridging an LPC interface to an ISA interface. FIG. 1 is a system structure diagram showing an LPC/ISA bridge according to an embodiment of the present invention. In FIG. 1, numeral 1 represents a host, and numeral 2 represents an expansion card. In this embodiment, a multifunction I/O chip 21 of the expansion card 2 is a peripheral IC with an ISA interface, and a chipset 23 of the host 1 is provided with an LPC interface. Therefore, it is an object of this embodiment to design an LPC/ISA bridge 22 to link the expansion card 2 to a mother board of the host 1, that is, to bridge an ISA interface to an LPC interface.

Figure 2:
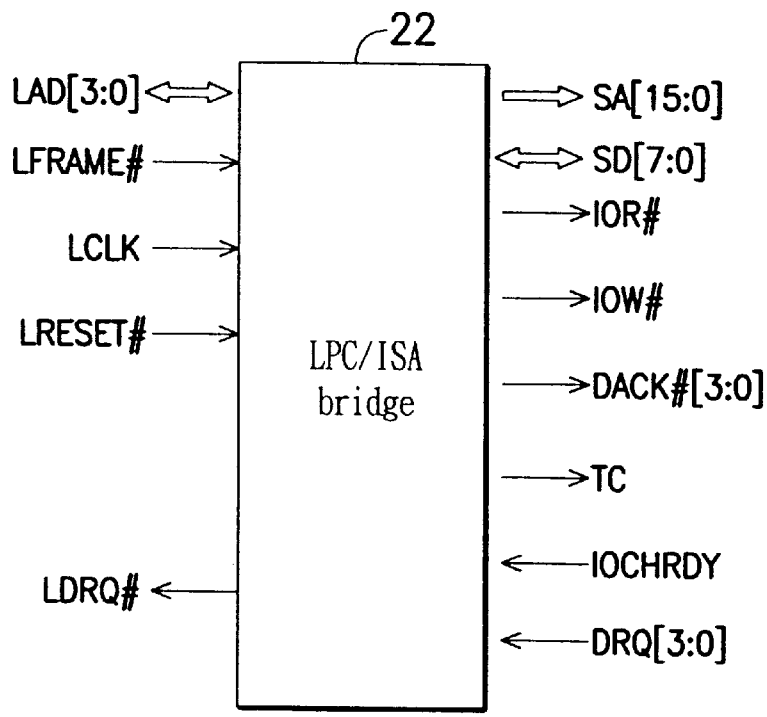
FIG. 2 is a diagram showing peripheral circuits of an LPC/ISA bridge according to an embodiment of the present invention.

FIG. 2 is a diagram showing peripheral circuits of the LPC/ISA bridge 22 according to this embodiment of the present invention. In FIG. 2, the left part represents signals of the LPC interface, including LAD[3:0], LFRAME#, LCLK, LRESET# and LDRQ#, and the right part represents signals of the ISA interface, including SA[15:0], SD[7:0], IOR#, IOW#, DACK#[3:0], TC, IOCHRDY and DRQ[3:0], wherein the notation "#" represents active low signals. Each signal is explained below.

Among the signals provided from the LPC interface, LAD[3:0] are command/address/data lines (4 bit wide) to transmit command, address and data information in series, which is a main difference from the ISA interface. LFRAME# is a duty cycle indicative signal to indicate the start of a duty cycle or abortion of a duty cycle. In this embodiment, a duty cycle is started when LFRAME# is pulled low and then high. LCLK is a clock signal (having a frequency of 33 MHz) synchronized with the command/address/data lines LAD[3:0], so as to abstract information therefrom. LRESET# is a reset signal. LDRQ# is a direct memory address (DMA) and a request signal for a bus master, which is a request signal inputted from a peripheral to a host.

Figure 3:
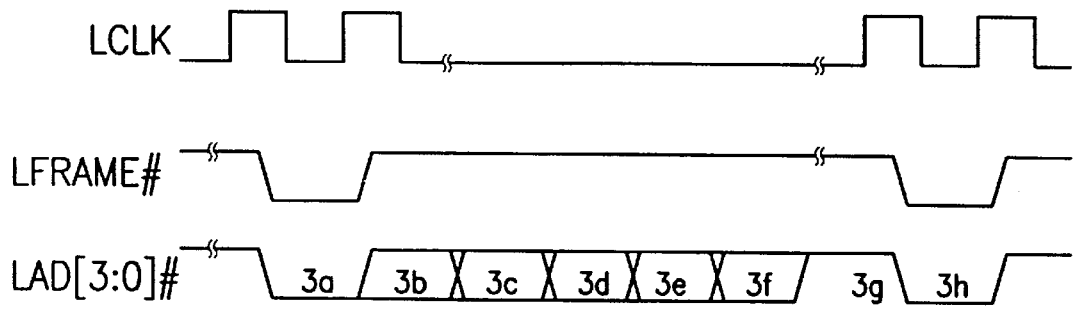
FIG. 3 is a timing diagram showing a clock signal LCLK, command/address/data lines LAD[3:0] and a duty cycle indicative signal LFRAME# in a typical duty cycle of an LPC interface.

A feature of the LPC interface is to input command, address and data information from the command/address/data lines LAD[3:0] in series. FIG. 3 is a timing diagram showing a clock signal LCLK, command/address/data lines LAD[3:0] and a duty cycle indicative signal LFRAME# in a typical duty cycle of the LPC interface. In FIG. 3, a duty cycle is prepared to start when the duty cycle indicative signal LFRAME# is pulled low, and the command/address/data lines LAD[3:0] are analyzed using the clock signal ICLK when the duty cycle indicative signal LFRAME# is pulled high. Before the duty cycle indicative signal LFRAME# is pulled high, the command/address/data lines LAD[3:0] output a start field 3a. The start field 3a indicates the start of this duty cycle if the command/address/data lines LAD[3:0] output 0000, and indicates abortion of this duty cycle if the command/address/data lines LAD[3:0] output 1111. In addition, the start field 3a can also indicate a bus master protocol. The start field 3a is followed by a cycle type 3b which is used to indicate read/write operations to be performed in this duty cycle, such as I/O read/write operations, memory read/write operations and DMA read/write operations. For convenience, FIG. 3 with its related descriptions are given with respect to the I/O read/write operations; other operations, such as the memory read/write operations and the DMA read/write operations, are added only when needed.

The cycle type 3b is followed by an address field 3c which indicates addresses for such read/write operations. The address field 3c is four clocks wide in I/O read/write operations (that is, the I/O address is 16 bits in length), and is eight clocks wide in memory read/write operations (that is, the memory address is 32 bits in length). Turn around time 3d, 3g is used to turn over control between a host and a peripheral, and is two clocks wide in general. Synchronization time 3e, which can be several clocks wide, is used to provide wait states and output a synchronization time-out signal (0000) before completion through the command/address/data lines LAD[3:0]. The synchronization time 3e is followed by a data field 3f which is two clocks wide or one byte. Thereafter, another start field 3h is provided to indicate start of the next duty cycle. Furthermore, for DMA operations, a size field and a channel field replace address field to indicate the data length (bytes) and the transmission path (channel).

Because the ISA interface is an industrial standardized interface, its detailed descriptions are omitted. Among the signals provided from the ISA interface, SA[15:0] are 16-bit address lines, SD[7:0] are 8-bit data lines for a 8-bit ISA interface (or 16-bit data lines SD[15:0] for a 16-bit ISA interface), IOR# and IOW# are control commands for I/O read and I/O write operations (there are also control commands for memory read and memory write operations when memory access), DACK# [3:0] are DMA acknowledge signals, TC is a terminal count signal for DMA operations, IOCHRDY is a I/O channel ready signal, and DRQ[3:0] are DMA request signals. In addition, there are many other signals provided from the ISA interface, which are mostly control signals for different operations, so the related descriptions are omitted.

Figure 4:
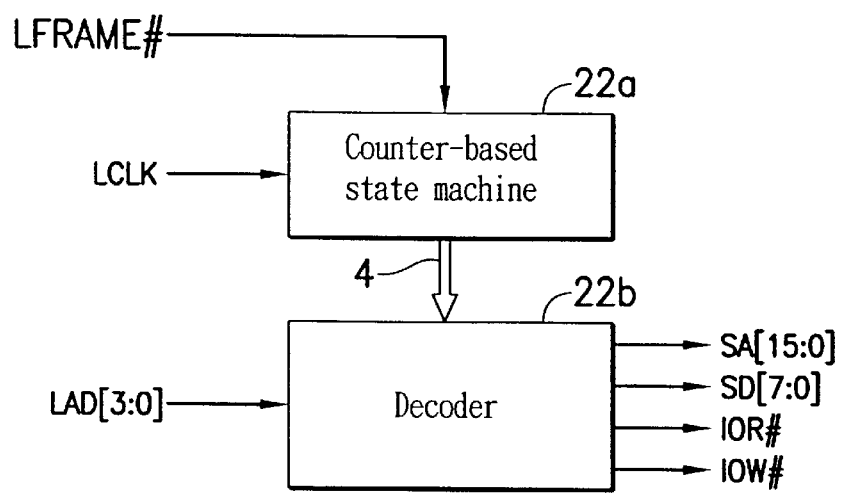
FIG. 4 is a block diagram showing an LPC/ISA bridge according to an embodiment of the present invention.

Hereafter is a description of signal conversions between an LPC interface and an ISA interface. FIG. 4 is a block diagram showing the LPC/ISA bridge 22 of this embodiment. In FIG. 4, the LPC/ISA bridge 22 includes a counter-based state machine 22a and a decoder 22b. The counter-based state machine 22a receives the duty cycle indicative signal LFRAME# and the clock signal LCLK from the LPC interface, and up counts by one in response to each pulse of the clock signal LCLK when the duty cycle indicative signal LFRAME# indicates start of this duty cycle (that is, the duty cycle indicative signal LFRAME# is pulled from high to low, and then from low to high), so as to output a sequence of state signals 4. The up-counting and outputting of the counter-based state machine 22a will go on until end of this duty cycle or until the duty cycle indicative signal LFRAME# indicates the abortion of this duty cycle. In other words, the state signals 4, including state signals (0)~(n), where n is a positive integer, represent continuous timing of a duty cycle, respectively. Further, in response to these state signals 4, the decoder 22b abstracts command, address and data information from the command/address/data lines LAD[3:0] of the LPC interface, and converts them into address, data and control signals of the ISA interface. Hereafter is a description given for I/O read/write operations, and other operations, such as memory read/write operations or DMA read/write operations, that can be implemented using similar methods, between which the difference is the generation of control signals, such as control signals DACK# [3:0] and DRQ[3:0] of the ISA interface in DMA read/write operations. Among signal conversions between different interfaces, address and data conversions are the most important.

Figure 5:
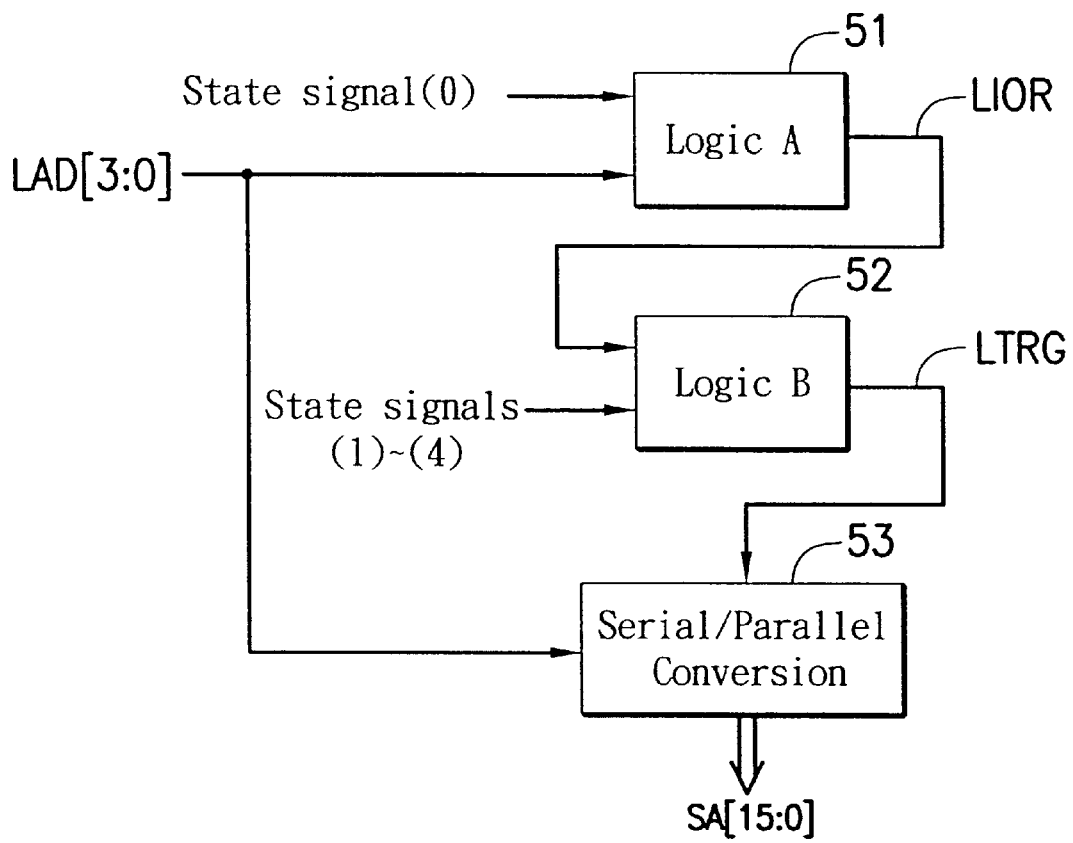
FIG. 5 is a logic flow diagram showing an I/O read operation of a decoder according to an embodiment of the present invention.

FIG. 5 is a logic flow diagram showing an I/O read operation of the decoder 22b according to this embodiment of the present invention. As mentioned above, since a duty cycle is started, the counter-based state machine 22a repeatedly generates a sequence of state signals in response to each pulse of the clock signal LCLK, which are respectively labeled as state signals(0)~(n), where n is a positive integer. Therefore, the address lines SA[15:0] of the ISA interface can be obtained using these state signals and the command/address/data lines LAD[3:0] as shown in FIG. 3.

In FIG. 5, the logic flow diagram includes a logic A 51, a logic B 52 and a serial/parallel conversion 53. At the state signal (0), the command/address/data lines LAD[3:0] output the cycle type 3b to indicate the operations to be performed in this duty cycle. When an I/O read operation is to be performed in this duty cycle, the command/address/data lines LAD[3:0] output 0000(B) according to the LPC interface specification. Therefore, the logic A 51 performs an AND operation over the state signal (0) and the command/address/data lines LAD[3:0], so as to generate an I/O read command signal LIOR. That is, when the state is at the state signal (0) and the command/address/data lines LAD[3:0] are 0000(B), an I/O read operation is to be performed in this duty cycle.

According to timing of the command/address/data lines LAD[3:0], when an I/O read operation is to be performed in this duty cycle (LIOR=1), the command/address/data lines LAD[3:0] output address information at the state signal (1)~(4). Therefore, the logic B 52 performs an AND operation over the I/O read command signal LIOR and the state signal (1)~(4), so as to generate a trigger signal LTRG to latch the address information. Thereafter, the serial/parallel conversion 53 sequentially latches the address information from the command/address/data lines LAD[3:0] for four clocks, and outputs them in parallel to serve as the address signal SA[15:0] of the ISA interface.

Using similar methods, serial data information can also be converted into data signals SD[7:0] of the ISA interface. However, before the data field of the I/O read operation, the command/address/data lines LAD[3:0] is likely to output a synchronization data field with uncertain length, so the data information can not be read from the command/address/data lines LAD[3:0] in a predetermined period. The uncertainty problem can be resolved using the synchronization time-out signal. At the wait states of the synchronization, the synchronization time-out signal is usually 0101 (B) or 0110 (B), and afterwards, the synchronization time-out signal is 0000 (B). Using this synchronization time-out signal 0000 (B), the data field can be obtained from the command/address/data lines LAD[3:0] for the upcoming two clocks. Therefore, the serial/parallel conversion of the data information can be implemented as shown in FIG. 5 to generate the data signals SD[7:0] of the ISA interface, and other control signals, such as the I/O read control command IOR#, can be generated in response to the timing of the ISA interface.

Figure 6:
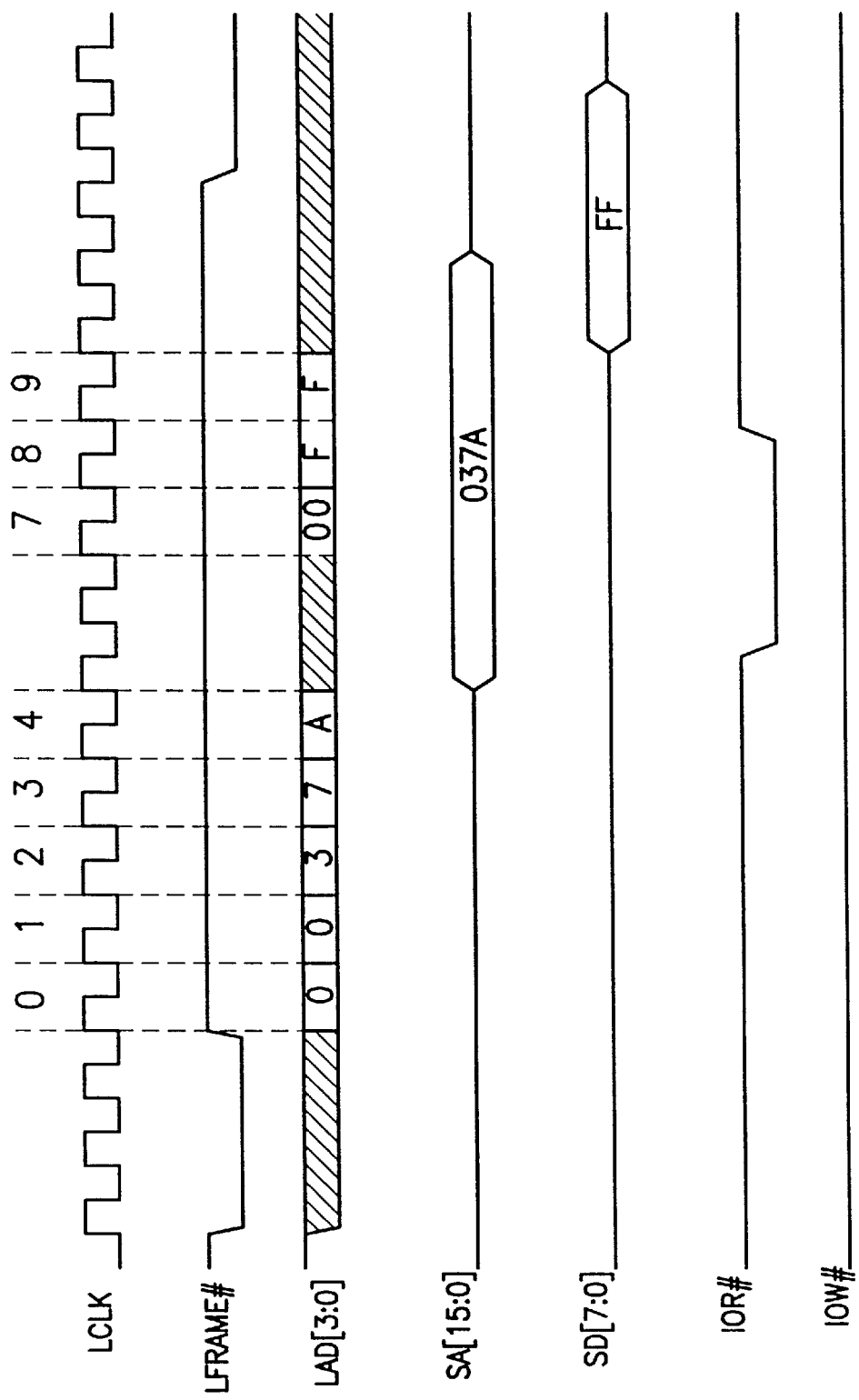
FIG. 6 is a timing diagram showing signals in an I/O read operation according to an embodiment of the present invention.

The same methods can also be used in an I/O write operation, in which the cycle type outputted from the command/address/data lines LAD[3:0] at the state signal (0) and the data field are different from those of an I/O read operation. That is, during the I/O write operation, the cycle type obtained from the command/address/data lines LAD [3:0] is 0010 (B). Therefore, the logic A must decide whether or not to generate an I/O write command LIOW, and other operations are the same as in FIG. 5. In addition, other operations, such as memory read/write operations or DMA read/write operations, can also be implemented using the same methods. And the logic blocks in FIG. 5 can be implemented using other logic circuits and serial/parallel conversion circuits, using a micro-controller, or structured as a finite state machine. FIG. 6 is a timing diagram showing signals in an I/O read operation according to this embodiment of the present invention. In FIG. 6, the duty cycle is started when the duty cycle indicative signal LFRAME# is pulled from high to low, and then from low to high. At the state signal (0), the command/address/data lines LAD[3:0] output a cycle type with a value (0 at this time) indicating the I/O read operation. At the state signal (1)~(4), the command/address/data lines LAD[3:0] output a address field with a value 037A(H). Therefore, the address signals SA[15:0] of the ISA interface can be generated using serial/parallel conversions. On the other hand, at later states, such as the state signal (8)~(9) in FIG. 6, the command/address/data lines LAD[3:0] output a data field with a value FF(H). Therefore, the data signals SD[7:0] of the ISA interface can also be generated using serial/parallel conversions. The I/O read control command IOR# is pulled low to indicate the I/O read operation of the ISA interface, while the I/O write control command IOW# remains unchanged. The timing of other signals can be derived similarly and is not repeated.

It should be understood that the present invention is not limited to the preferred embodiment as disclosed above. Variations and modifications can be made by those who are skillful in the art without departing from the spirit and scope of the present invention as defined in the appended claims. By way of example, the number of rounds performed in the encryption and decryption processing can be increased or decreased as the user sees fit. Other changes will also suggest themselves to those skilled in this technology. Thus, this invention is not to be limited to the disclosed embodiment except as required by the appended claims.

What is claimed is:

1. An LPC/ISA bridge installed on an expansion card, for bridging an LPC interface to an ISA interface, wherein the LPC/ISA bridge is active in response to a duty cycle indicative signal (LFRAME#) of the LPC interface and sequentially transforms command, address and data information from command/address/data lines (LAD[3:0]) of the LPC interface into address, data and control signals of the ISA interface.

2. An LPC/ISA bridge for bridging an LPC interface to an ISA interface, comprising:

a counter-based state machine, receiving a duty cycle indicative signal (LFRAME#) of the LPC interface, for counting in response to a clock signal and serially outputting a plurality of state signals when a duty cycle is activated by the duty cycle indicative signal, and stopping counting and outputting when the duty cycle is completed or inactivated by the duty cycle indicative signal; and a decoder, receiving the plurality of state signals of the counter-based state machine and command/address/ data lines (LAD[3:0]) of the LPC interface, and transforming command, address and data information abstracted from the command/address/data lines into address, data and control signals of the ISA interface in response to the plurality of state signals.

3. The LPC/ISA bridge as claimed in claim 2, wherein the decoder is structured using a plurality of logic circuits and serial/parallel converters.

4. The LPC/ISA bridge as claimed in claim 2, wherein the decoder is structured using a microprocessor.

5. The LPC/ISA bridge as claimed in claim 2, wherein the counter-based state machine is structured using a finite-state state machine.

6. A method of bridging an LPC interface to an ISA interface, comprising the steps of:

providing a counter-based state machine to receive a duty cycle indicative signal (LFRAME#) of the LPC interface, for counting and serially outputting a plurality of state signals in response to a clock signal when a duty cycle is activated by the duty cycle indicative signal, and stopping counting and outputting when the duty cycle is inactivated by the duty cycle indicative signal;

latching address information from command/address/data lines (LAD[3:0]) of the LPC interface in response to a first set of the state signals;

latching data information from the command/address/data lines in response to a second set of the state signals; and producing data signals of the ISA interface by outputting the data information from the command/address/data lines in parallel.

7. The method of bridging an LPC interface to an ISA interface as claimed in claim 6, wherein the counter-based state machine is structured using a finite-state state machine.

* * * * *